United States Patent
Jung et al.

(10) Patent No.: US 10,563,038 B2
(45) Date of Patent: Feb. 18, 2020

(54) POLYCARBONATE RESIN COMPOSITION AND MOLDED ARTICLE PRODUCED THEREFROM

(71) Applicant: Lotte Advanced Materials Co., Ltd., Yeosu-si (KR)

(72) Inventors: Yoo Jin Jung, Uiwang-si (KR); Eun Taek Woo, Uiwang-si (KR); Eric Arifin, Uiwang-si (KR); Jung Ki Kim, Uiwang-si (KR); Na Ri Park, Uiwang-si (KR); Mi Rae Jang, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/134,578

(22) Filed: Apr. 21, 2016

(65) Prior Publication Data
US 2016/0311999 A1 Oct. 27, 2016

(30) Foreign Application Priority Data
Apr. 24, 2015 (KR) .................. 10-2015-0058057

(51) Int. Cl.
C08K 3/32 (2006.01)
C08K 7/14 (2006.01)

(52) U.S. Cl.
CPC .............. *C08K 3/32* (2013.01); *C08K 7/14* (2013.01); *C08K 2003/328* (2013.01)

(58) Field of Classification Search
CPC ...... C08K 3/32; C08K 7/14; C08K 2003/328; C08L 23/0869; C08L 69/00
USPC ................. 524/425, 494; 523/209
See application file for complete search history.

(56) References Cited

U.S. PATENT DOCUMENTS

| | | | | |
|---|---|---|---|---|
| 6,060,538 A * | 5/2000 | Gallucci | ................ | C08L 69/00 523/217 |
| 6,399,739 B1 * | 6/2002 | McCloskey | .......... | C08G 64/307 528/196 |
| 8,309,640 B2 | 11/2012 | Li et al. | | |
| 8,841,367 B2 | 9/2014 | Zheng et al. | | |
| 8,895,649 B2 | 11/2014 | Li et al. | | |
| 8,927,661 B2 | 1/2015 | Li et al. | | |
| 9,018,286 B2 | 4/2015 | Daga et al. | | |
| 9,023,923 B2 | 5/2015 | An et al. | | |
| 9,394,483 B2 | 7/2016 | Wu et al. | | |
| 2006/0293438 A1 * | 12/2006 | de Souza | ................... | C08J 5/18 524/502 |
| 2011/0251326 A1 * | 10/2011 | Van Hartingsveldt | ...................... | C08L 51/00 524/430 |
| 2012/0329922 A1 * | 12/2012 | Schrauwen | ............ | H05K 3/185 524/165 |
| 2014/0296410 A1 | 10/2014 | Cheng et al. | | |

FOREIGN PATENT DOCUMENTS

| | | |
|---|---|---|
| CN | 1206027 A | 1/1999 |
| CN | 104066793 A | 9/2014 |
| CN | 104428354 A | 3/2015 |
| EP | 0 575 870 * | 5/2000 |
| JP | 2000-154313 A | 6/2000 |
| KR | 10-2011-0018319 A | 2/2011 |
| WO | 2014/162254 A1 | 10/2014 |

OTHER PUBLICATIONS

Office Action in counterpart Korean Application No. 10-2015-0058057 dated Apr. 13, 2017, pp. 1-6.
Office Action in counterpart Chinese Application No. 201610258667.4 dated Jul. 31, 2017, pp. 1-7.
English-translation of Office Action in counterpart Chinese Application No. 201610258667.4 dated Jul. 31, 2017, pp. 1-7.

* cited by examiner

*Primary Examiner* — Doris L Lee
(74) *Attorney, Agent, or Firm* — Additon, Higgins & Pendleton, P.A.

(57) ABSTRACT

A polycarbonate resin composition and a molded article manufactured using the same. The polycarbonate resin composition includes: (A) a polycarbonate resin including end groups, wherein the end groups include a hydroxyl group (—OH) in an amount of about 1% to about 20% based on the total weight (100 wt %) of all end groups; and (B) a metal compound comprising at least one of a metal oxide, a heavy metal complex oxide, and a copper salt. The polycarbonate resin composition and a molded article manufactured using the same can have excellent properties in terms of impact strength, flexural strength, and processability.

9 Claims, No Drawings

POLYCARBONATE RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application 10-2015-0058057, filed Apr. 24, 2015, the entire disclosure of which is incorporated herein by reference.

FIELD

The present invention relates to a polycarbonate resin composition and a molded article manufactured using the same.

BACKGROUND

A polycarbonate resin has a lower specific gravity than glass or metal and can have excellent moldability and mechanical properties such as impact resistance. Plastic products made using such a polycarbonate resin are rapidly replacing glass and metal products in the fields of electric/electronic products and automotive parts.

Recently, studies have been done on technology for forming desired fine patterns at a desired position by introducing a material as an additive that is capable of providing processability for direct coating or laser structuring to a polycarbonate resin.

For example, an antenna of a smartphone requires a separate electrode for each frequency bandwidth. In order to realize fine patterns corresponding to frequency bands, laser direct structuring (LDS) technology using such an additive is widely used. This technology has an advantage in terms of internal design, with the trend of reduction in smartphone thickness.

However, when such an additive is introduced into a polycarbonate resin, there is a problem in that the additive decomposes due to additional reaction with the polycarbonate resin, which can cause significant deterioration in mechanical properties of the polycarbonate resin.

Therefore, in order to overcome these problems, there is a need for a polycarbonate resin composition which can exhibit excellent processability while maintaining mechanical properties of a polycarbonate resin, such as impact strength and flexural strength.

SUMMARY OF THE INVENTION

Exemplary embodiments relate to a polycarbonate resin composition useful for laser direct structuring, and a molded article manufactured using the same. Exemplary embodiments provide a polycarbonate resin composition which can have excellent mechanical properties such as impact strength and flexural strength by adjusting characteristics of end groups of a polycarbonate resin and also can exhibit excellent processability by controlling the amount (weight) ratio of a metal compound to the polycarbonate resin with the controlled end group characteristics, and a molded article manufactured using the same.

The polycarbonate resin composition includes: (A) a polycarbonate resin including end groups, wherein the end groups include a hydroxyl group (—OH) in an amount of about 1% to about 20% based on the total amount (100 wt %) of all end groups; and (B) a metal compound comprising at least one of a metal oxide, a heavy metal complex oxide, and a copper salt.

In exemplary embodiments, the polycarbonate resin composition may further include (C) inorganic fillers.

In exemplary embodiments, the polycarbonate resin composition may include: about 50 wt % to about 95 wt % of the polycarbonate resin (A); about 1 wt % to about 20 wt % of the metal compound (B); and about 1 wt % to about 40 wt % of the inorganic fillers (C).

In exemplary embodiments, a weight ratio of the polycarbonate resin (A) to the metal compound (B) may range from about 100: about 1 to about 100: about 30.

In exemplary embodiments, the metal oxide may have a spinel structure.

In exemplary embodiments, the metal oxide may include at least one of copper oxide, zinc oxide, tin oxide, magnesium oxide, aluminum oxide, gold oxide, and silver oxide.

In exemplary embodiments, the heavy metal complex oxide may be a heavy metal complex oxide represented by Formula 1:

$$AB_2O_4 \qquad \text{[Formula 1]}$$

wherein A is cadmium, chromium, manganese, nickel, zinc, copper, cobalt, iron, magnesium, tin, or titanium; and B is chromium, iron, aluminum, nickel, manganese, molybdenum, antimony, bismuth, or tin.

In exemplary embodiments, the copper salt may include at least one of copper hydroxide phosphate, copper phosphate, copper sulfate, and cuprous thiocyanate.

In exemplary embodiments, the inorganic fillers (C) may include glass fibers.

In exemplary embodiments, the polycarbonate resin (A) may include about 10,000 ppm to about 200,000 ppm of the hydroxyl group (—OH).

In exemplary embodiments, the polycarbonate resin composition may have an impact resistance of about 40 cm to about 100 cm, as measured on a plate-type injection molded specimen having a size of about 1 mm×about 5 cm×about 5 cm (thickness×width×length) and left for aging at room temperature for about 6 hours using a falling weight impact tester with about 500 g weight in accordance with the DuPont drop test method, in which the impact resistance is found by impacting about 20 specimens with the weight to measure a height of the weight at which about 50% of each specimen is broken, followed by averaging values of the height.

In exemplary embodiments, the polycarbonate resin composition may have a gas generation amount of about 50 areas to about 340 areas per hour, as measured on about 2 g of pellets of the polycarbonate resin composition having been dried for about 5 hours using a static headspace sampler by headspace gas chromatography (HS-GC).

Other embodiments relate to a molded article. The molded article is manufactured using the polycarbonate resin composition as set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with exemplary embodiments, a polycarbonate resin composition includes: (A) a polycarbonate resin; and (B) a metal compound.

(A) Polycarbonate Resin

The polycarbonate resin may be a polycarbonate resin including end groups, wherein the end groups include a hydroxyl group (—OH) in an amount of about 1% to about 20%, for example, about 1% to about 15%, and as another example about 1% to about 10%, based on the total weight (100 wt %) of all end groups. Stated differently, the polycarbonate resin may be a polycarbonate resin in which a hydroxyl group (—OH) accounts for about 1% to about 20% of all end groups.

The concentration of the hydroxyl group in the above range may be obtained by adjusting an end capping rate. If the concentration of the end hydroxyl group exceeds about 20% of all end groups, there is a concern of deterioration in properties such as impact strength and flexural strength of the polycarbonate resin composition due to additional reaction between an uncapped end group (end hydroxyl group) of the polycarbonate resin and the metal compound and an excess of gas can be generated during preparation, thereby causing deterioration in continuous workability. If the concentration of the end hydroxyl group is less than about 1% of all end groups, there is a concern of deterioration in processability of the polycarbonate resin composition.

In other words, both mechanical properties and processability of the polycarbonate resin composition can be considerably improved by adjusting the end capping rate (concentration of the end hydroxyl group) of the polycarbonate resin.

In exemplary embodiments, the polycarbonate resin may be an aromatic polycarbonate resin prepared by reacting a carbonate precursor, such as phosgene, halogen formate, and/or carbonic diester, with one or more diphenols represented by Formula 2 such that an end hydroxyl group is present in a concentration in the above range.

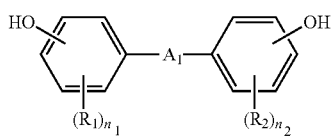

[Formula 2]

wherein $A_1$ is a single bond, a substituted or unsubstituted $C_1$ to $C_5$ alkylene group, a substituted or unsubstituted $C_1$ to $C_5$ alkylidene group, a substituted or unsubstituted $C_3$ to $C_6$ cycloalkylene group, a substituted or unsubstituted $C_5$ to $C_6$ cycloalkylidene group, CO, S, or $SO_2$; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4.

As used herein, the term "substituted" means that a hydrogen atom in a functional group is substituted with a substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, and combinations thereof.

Examples of the diphenols may include without limitation hydroquinone, resorcinol, 4,4'-dihydroxyphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. For example, the diphenols may include 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example, 2,2-bis-(4-hydroxyphenyl)-propane, which is also referred to as bisphenol A.

The polycarbonate resin may be prepared by polymerization of a monomer mixture including an aromatic dihydroxy compound (diphenols) and carbonic diester such as diaryl carbonate, wherein the monomer mixture may include about 0.001 wt % or less (and greater than 0 wt %) of an end-stopping (capping) agent. Here, polymerization (transesterification) may be performed in the presence of a catalyst including an alkali metal, an alkali earth metal, or a combination thereof. Using the end-stopping agent (or capping agent), it is possible to prepare a polycarbonate resin in which the concentration of an end hydroxyl group (—OH) is adjusted in the range of about 1% to about 20% to provide a polymer having a controlled molecular weight and good processability.

Examples of the end-stopping agent may include, without being limited to, dialkyl and/or dicycloalkyl carbonates such as dibutyl carbonate, dipentyl carbonate, butylpentyl carbonate, dihexyl carbonate, dicyclohexyl carbonate, diheptyl carbonate, and dioctyl carbonate, aromatic carbonate derivatives represented by Formula 3, and the like, and combinations thereof:

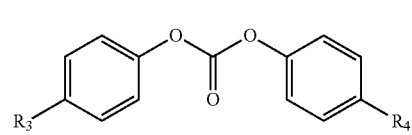

[Formula 3]

wherein $R_3$ is hydrogen, a t-butyl group, or a p-cumyl group, and $R_4$ is a t-butyl group or a p-cumyl group. As used herein, the alkyl of the dialkyl refers to $C_1$ to $C_{20}$ alkyl and the cycloalkyl of the dicycloalkyl refers to $C_5$ to $C_{20}$ alkyl In exemplary embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography, without being limited thereto.

The polycarbonate resin may include a linear polycarbonate resin, a branched polycarbonate resin, and/or a polyester carbonate copolymer resin.

Examples of the linear polycarbonate resin may include a bisphenol A polycarbonate resin. Examples of the branched polycarbonate resin may include a polycarbonate resin prepared by adding a tri- or higher polyfunctional compound, for example, a tri- or higher valent phenol group-containing compound in an amount of about 0.05 parts by mole to about 2 parts by mole based on about 100 parts by mole of the diphenol(s). The polyester carbonate copolymer resin may be prepared by reacting a bifunctional carboxylic acid with diphenol and carbonate, wherein the carbonate may be a diaryl carbonate such as diphenyl carbonate and/or ethylene carbonate.

In exemplary embodiments, the polycarbonate resin may include a homopolycarbonate resin, a copolycarbonate resin, and/or a blend of one or more copolycarbonate resin(s) and/or one or more homopolycarbonate resin(s).

In exemplary embodiments, the polycarbonate resin may include about 10,000 ppm to about 200,000 ppm (by mole), for example, about 10,000 ppm to about 150,000 ppm, of the hydroxyl group. Within this range, it can be possible to reduce decomposition of the polycarbonate resin and to provide excellent mechanical properties to the polycarbonate resin composition.

In exemplary embodiments, the polycarbonate resin composition can include the polycarbonate resin (A) in an amount of about 50 wt % to about 95 wt %, for example, about 60 wt % to about 95 wt %, based on the total weight (100 wt %) of the polycarbonate resin composition including the polycarbonate resin (A), the metal compound (B), and inorganic fillers (C). In some embodiments, the polycarbonate resin composition can include the polycarbonate resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the polycarbonate resin (A) can be present in an amount of from about any of the foregoing amounts to about any other of the foregoing amounts.

Within this range, the polycarbonate resin can properly serve as a base resin, and the polycarbonate resin composition can exhibit excellent properties in terms of impact resistance, flexural strength, and processability.

(B) Metal Compound

The metal compound is a material that is activated under light by stimulated emission to provide coatability and processability to the polycarbonate resin and can allow direct coating or laser structuring. As used herein, the term "light by stimulated emission" refers to light amplified by stimulated emission. Light by stimulated emission may be UV light at a wavelength of about 100 nm to about 400 nm, visible light at a wavelength of 400 nm to about 800 nm, and/or infrared light at a wavelength of about 800 nm to about 25,000 nm, for example, X-rays, gamma-rays, and/or particle beams (electron-beams, α-particle beams, and/or β-particle beams), for example, infrared light at a wavelength of about 1,064 nm.

In the metal compound placed on a surface of the polycarbonate resin composition, metal atoms included in the metal compound as nucleating agents can be activated when exposed to light by stimulated emission. As a result, since a region exposed to light by stimulated emission is activated by the metal atoms, the region exposed to light by stimulated emission can form a conductive structure.

Examples of the metal compound may include without limitation metal oxides, heavy metal complex oxides (wherein the metal oxide is not the same as the heavy metal oxide), copper salts, and the like, and combinations thereof.

In exemplary embodiments, the metal oxide may have a spinel structure.

Examples of the metal oxide may include without limitation copper oxide, zinc oxide, tin oxide, magnesium oxide, aluminum oxide, gold oxide, silver oxide, and the like, and combinations thereof.

In exemplary embodiments, the heavy metal complex oxide may be a heavy metal complex oxide represented by Formula 1:

$$AB_2O_4 \quad \text{[Formula 1]}$$

wherein A is cadmium, chromium, manganese, nickel, zinc, copper, cobalt, iron, magnesium, tin, or titanium; and B is chromium, iron, aluminum, nickel, manganese, molybdenum, antimony, bismuth, or tin.

In the heavy metal complex oxide represented by Formula 1, A may provide a monovalent cation component of a metal oxide cluster; B may provide a monovalent cation component of a metal oxide cluster; the metal oxide cluster including A may have a tetrahedral structure; and the metal oxide cluster including B may have an octahedral structure. In addition, the heavy metal complex oxide represented by Formula 1 may have a structure in which oxygen anions are arranged in a cubic close-packed lattice, and B and A respectively occupy octahedral and tetrahedral sites in the lattice.

Examples of the heavy metal complex oxide may include without limitation magnesium aluminum oxide ($MgAl_2O_4$), zinc aluminum oxide ($ZnAl_2O_4$), iron aluminum oxide ($FeAl_2O_4$), copper iron oxide ($CuFe_2O_4$), copper chromium oxide ($CuCr_2O_4$), manganese iron oxide ($MnFe_2O_4$), nickel iron oxide ($NiFe_2O_4$), titanium iron oxide ($TiFe_2O_4$), iron chromium oxide ($FeCr_2O_4$), magnesium chromium oxide ($MgCr_2O_4$), and the like, and combinations thereof. For example, when a final molded article is required to be black or grey, the heavy metal complex oxide may be copper chromium oxide ($CuCr_2O_4$), which has dark color.

Examples of the copper salt may include without limitation copper hydroxide phosphate, copper phosphate, copper sulfate, cuprous thiocyanate, and the like, and combinations thereof. For example, the copper salt may be copper hydroxide phosphate. Copper hydroxide phosphate is a compound in which copper phosphate is combined with copper hydroxide, and examples thereof may include without limitation $Cu_3(PO_4)_2 \cdot 2Cu(OH)_2$, $Cu_3(PO_4)_2 \cdot Cu(OH)_2$, and the like, and combinations thereof. Copper hydroxide phosphate does not affect color-reproduction properties of a colorant, as an additive, and thus can allow a molded article having desired color to be easily obtained.

In exemplary embodiments, the metal compound may have an average particle diameter of about 0.01 μm to about 50 μm, for example, about 0.1 μm to about 30 μm, and as another example about 0.5 μm to about 10 μm. Within this range, it is possible to uniformly form a coating surface in direct coating or laser structuring.

As used herein, unless otherwise stated, the term "average particle diameter" refers to D50 (a diameter at a distribution rate of 50%) which is a number average particle diameter.

In exemplary embodiments, the metal compound may take a form in which a material such as mica, talc, and/or titanium oxide is coated on and/or otherwise bonded to a metal oxide, a heavy metal complex oxide, and/or a copper salt. Here, mica, talc, and/or titanium oxide may be coated on and/or bonded to a surface of the metal compound (a metal oxide, a heavy metal complex oxide, and/or a copper salt) in an amount of about 10 parts by weight to about 40 parts by weight based on about 100 parts by weight of the metal compound. In some embodiments, the metal compound can include a material such as mica, talc, and/or titanium oxide in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the material such as mica, talc, and/or titanium oxide can be present in an amount of from about any of the foregoing amounts to about any other of the foregoing amounts.

In exemplary embodiments, a weight ratio of the polycarbonate resin (A) to the metal compound (B) may range from about 100: about 1 to about 100: about 30, for example, about 100: about 5 to about 100: about 20. Within this range, the polycarbonate resin composition can exhibit excellent mechanical properties such as impact strength and flexural strength while having excellent processability and coatability.

In exemplary embodiments, the polycarbonate resin composition can include the metal compound (B) in an amount of about 1 wt % to about 20 wt %, for example, about 2 wt % to about 18 wt %, based on the total weight 100 wt %) of the polycarbonate resin composition including the polycarbonate resin (A), the metal compound (B), and the inorganic fillers (C). In some embodiments, the polycarbonate resin composition can include the metal compound (B) in an amount of about 1, 2, 3, 4, 5, 6, 7, 8, 9, 10, 11, 12, 13, 14, 15, 16, 17, 18, 19, or 20 wt %. Further, according to some embodiments of the present invention, the metal compound (B) can be present in an amount of from about any of the foregoing amounts to about any other of the foregoing amounts.

Within this range, the polycarbonate resin composition (or a molded article) can easily realize fine patterns upon direct coating or laser structuring while exhibiting excellent properties in terms of impact resistance, flexural strength, and the like.

(C) Inorganic Fillers

The polycarbonate resin composition may further include (C) inorganic fillers to further improve mechanical properties thereof.

In exemplary embodiments, the inorganic fillers may be glass fibers. The glass fibers may include any suitable glass fibers generally used in the art; may have a circular, elliptical, rectangular, and/or dumbbell shape in cross-section; may have a diameter of about 8 μm to about 20 μm; and may have a length of about 1.5 mm to about 8 mm. Within this range of diameter, the glass fibers can provide high strength reinforcement, and, within this range of length, the glass fibers can be easily put into processing equipment such as an extruder while providing high strength reinforcement.

In addition, the glass fibers may have a sectional aspect ratio of about 1 to about 10, for example, about 1 to about 8. For example, the glass fibers may be circular glass fibers having a sectional aspect ratio of about 1 or rectangular flat glass fibers having a sectional aspect ratio of about 1.5 or greater. As used herein, the aspect ratio is defined as a ratio of the longest diameter to the shortest diameter in a cross-sectional view of the glass fibers. Within this range of sectional aspect ratio, it is possible to lower unit cost of production and to provide excellent properties in terms of dimensional stability and appearance to the polycarbonate resin composition (or a molded article).

In exemplary embodiments, the glass fibers may be mixed with another type of fiber that is not the same as the glass fibers, such as but not limited to carbon fibers, basalt fibers, fibers prepared from biomass, and the like, and combinations thereof. As used here, biomass refers to plant materials and/or microorganisms used as a fuel and/or energy source.

In addition, the glass fibers may be subjected to surface treatment with a specific sizing material to prevent reaction with the polycarbonate resin and to improve wettability. Such surface treatment may be performed in fabrication of the glass fibers or in post-processing.

In exemplary embodiments, the polycarbonate resin composition can include the inorganic fillers (C) in an amount of about 1 wt % to about 40 wt %, for example, about 3 wt % to about 35 wt %, based on the total weight (100 wt %) of the polycarbonate resin composition including the polycarbonate resin (A), the metal compound (B), and the inorganic fillers (C). In some embodiments, the polycarbonate resin composition can include the glass fibers (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the glass fibers (C) can be present in an amount of from about any of the foregoing amounts to about any other of the foregoing amounts.

Within this range, the polycarbonate resin composition can exhibit further improved mechanical properties with minimal or no deterioration in other properties.

The polycarbonate resin composition may further include one or more additives, as needed. Examples of the additives may include impact modifiers, flame retardants, lubricants, plasticizers, heat stabilizers, antioxidants, photostabilizers, colorants, and the like, and combinations thereof, without being limited thereto.

The impact modifiers serve to improve impact resistance of the polycarbonate resin composition and may be, for example, a styrene elastomer and/or an olefin elastomer. Examples of the styrene elastomer may include without limitation a styrene-ethylene-butylene-styrene copolymer, a styrene-butadiene-styrene copolymer, a styrene-ethylene-propylene-styrene copolymer, styrene-isoprene-styrene copolymer, a styrene-ethylene copolymer, styrene-ethylene-butadiene-styrene copolymer, and the like, and combinations thereof. Examples of the olefin elastomer may include without limitation high-density polyethylene, low-density polyethylene, linear low-density polyethylene, an ethylene-α-olefin copolymer, and the like, and combinations thereof.

The flame retardants serve to improve flame retardancy of the polycarbonate resin composition. Examples of the flame retardant may include a phosphate compound, a phosphite compound, a phosphonate compound, polysiloxane, a phosphazene compound, a phosphinate compound, a melamine compound, and the like, and combinations thereof, without being limited thereto.

The lubricants serve to lubricate a surface of a metal contacting the polycarbonate resin composition during processing, molding, and/or extrusion to facilitate flow and/or migration of the resin composition and may include any typical lubricants known in the art.

The plasticizers serve to increase flexibility, processability, and/or expansibility of the polycarbonate resin composition and may include any typical plasticizers known in the art.

The heat stabilizers serve to suppress pyrolysis of the polycarbonate resin composition in kneading and/or molding at high temperature and may include any typical heat stabilizers known in the art.

The antioxidants serve to suppress and/or block chemical reaction between the polycarbonate resin composition and oxygen, thereby preventing loss of inherent properties of the resin composition due to decomposition of the resin composition. Examples of the antioxidants may include phenol-type, phosphite-type, thioether-type and/or amine-type antioxidants, without being limited thereto.

The photostabilizers serve to suppress and/or block discoloration and/or loss of mechanical properties of the polycarbonate resin composition due to decomposition caused by UV light and may include, for example, titanium oxide.

The colorants may include any typical pigments and/or dyes.

In exemplary embodiments, the additives may be present in an amount of about 1 part by weight to about 15 parts by weight based on about 100 parts by weight of the polycarbonate resin composition, without being limited thereto.

The polycarbonate resin composition may have an impact resistance of about 40 cm or higher, for example, about 40 cm to about 100 cm, as measured on a plate-type injection molded specimen having a size of about 1 mm×about 5 cm×about 5 cm (thickness×width×length) and left for aging at room temperature for about 6 hours using a falling weight impact tester with about 500 g weight in accordance with the DuPont drop test method, in which the impact resistance is found by impacting about 20 specimens with the weight to measure a height of the weight at which about 50% of each specimen is broken, followed by averaging values of the height.

In addition, the polycarbonate resin composition may have a gas generation amount of about 50 areas to about 340 areas per hour, for example, about 50 areas to about 340 areas per hour, as measured on about 2 g of pellets of the polycarbonate resin composition having been dried for about 5 hours using a static headspace sampler by headspace gas chromatography (HS-GC).

A molded article can be manufactured using the polycarbonate resin composition as set forth above. For example, the polycarbonate resin composition may be produced into a molded article through various molding methods, such as injection molding, double injection molding, blow molding, extrusion, and thermoforming such molding methods are well known to those skilled in the art. The polycarbonate resin composition (or molded article) may be applied to various fields such as a variety of electric/electronic products and automotive parts, and can be useful as a molded article using laser direct structuring (LDS).

Through repeated testing, it could be confirmed that the numerical limitations as described above have critical significance in that the polycarbonate resin composition (molded article) according to the present invention can have excellent impact resistance and flexural strength while exhibiting improved processability, thereby efficiently realizing a metal microcircuit.

Hereinafter, the present invention will be described in more detail with reference to the following examples. It should be understood that these examples are provided for illustration only and are not to be construed in any way as limiting the present invention.

EXAMPLES

Details of Components Used in the Following Examples and Comparative Examples are as Follows:

(a) Polycarbonate Resin (a-1) A middle viscosity polycarbonate resin having an end capping rate of 85% (concentration of end hydroxyl group: 15%) (Samsung SDI) is used.

(a-2) A middle viscosity polycarbonate resin having an end capping rate of 75% (concentration of end hydroxyl group: 25%) (Samsung SDI) is used.

(b) Metal Compound

Copper hydroxide phosphate (LM-1, Merck Co., Ltd) is used.

(c) Inorganic Filler

Glass fibers (183F, Owens Corning Fiberglas Corporation, sectional aspect ratio: 1.0) are used.

(d) Impact Modifier

An ethylene/(meth)acrylate copolymer (Elvaroy AC1330, DuPont) is used.

Examples 1 to 5 and Comparative Examples 1 to 5

Polycarbonate resin compositions of Examples and Comparative Examples are prepared in amount ratios as listed in Table 1. The amount of each of (a), (b), and (c) is represented in % by weight (wt %) based on the total weight of (a), (b), and (c), and the amount of (d) is represented in parts by weight based on 100 parts by weight of (a), (b), and (c). In Comparative Examples 1, 2, 3, 4, and 5, polycarbonate resin compositions are prepared in the same manner as in Examples 1, 2, 3, 4, and 5, respectively, except that a polycarbonate resin having a different end capping rate is used.

The components are added in amounts as listed in Table 1 and dry-mixed, followed by extrusion using a twin-screw type extruder (ϕ=36 mm) at a barrel temperature of 250° C. to 310° C., thereby preparing pellets. Then, the prepared pellets are dried at 80° C. for 4 hours or more, followed by injection molding, thereby preparing a specimen for property evaluation.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| (a-1) | 92 | 82 | 72 | 62 | 52 | — | — | — | — | — |
| (a-2) | — | — | — | — | — | 92 | 82 | 72 | 62 | 52 |
| (b) | 8 | 8 | 8 | 8 | 8 | 8 | 8 | 8 | 8 | 8 |
| (c) | — | 10 | 20 | 30 | 40 | — | 10 | 20 | 30 | 40 |
| (d) | 3 | 3 | 3 | 3 | 3 | 3 | 3 | 3 | 3 | 3 |

The polycarbonate resin compositions of Examples 1 to 5 and Comparative Examples 1 to 5 are evaluated as to impact strength, flexural strength, impact resistance, flowability, generation amount of volatile organic compounds (VOCs), and concentration of a hydroxyl group (—OH). Results are shown in Table 2.

Property Evaluation (1) Izod impact strength (kgf·cm/cm): Izod impact strength is measured on ⅛" thick Izod specimens in accordance with ASTM D256.

(2) Flexural strength (kgf/cm$^2$): Flexural strength of each of the specimens is measured at 2.8 mm/min in accordance with ASTM D790.

(3) Impact resistance (cm): A plate-type specimen having a size of 1 mm×5 cm×5 cm (thickness×width×length) is prepared by injection molding and then left for aging at room temperature for 6 hours. 20 specimens are subjected to impact testing using a falling weight impact tester with a 500 g weight in accordance with the DuPont drop test method to measure a height of the weight at which about 50% of each specimen is broken, followed by averaging values of the height.

(4) Melt-flow index (g/10 min): Melt index is measured under conditions of 250° C./10 kg in accordance with ASTM D1238.

(5) Generation amount of volatile organic compound (unit:area): 2 g of pellets prepared using each of the polycarbonate resin compositions are dried for 5 hours using a static headspace sampler, followed by measuring a gas generation amount per hour by headspace gas chromatography (HS-GC).

(6) Concentration of hydroxyl group (—OH) (%): A phenol end group is analyzed by FT-IR spectroscopy, thereby measuring concentration of a hydroxyl group in all end groups.

TABLE 2

| Evaluation item | Example | | | | | Comparative Example | | | | |
|---|---|---|---|---|---|---|---|---|---|---|
| | 1 | 2 | 3 | 4 | 5 | 1 | 2 | 3 | 4 | 5 |
| Impact strength | 60 | 22 | 21 | 21 | 20 | 50 | 15 | 14 | 12 | 11 |
| Flexural strength | 25500 | 32700 | 45500 | 61200 | 78900 | 22600 | 31300 | 39200 | 52300 | 61800 |
| Impact resistance | 90 | 65 | 56 | 47 | 40 | 72 | 49 | 32 | 28 | 19 |
| Melt-flow index | 26 | 18 | 15 | 12 | 10 | 30 | 21 | 17 | 15 | 12 |
| VOCs | 120 | 190 | 260 | 300 | 320 | 240 | 480 | 530 | 590 | 610 |
| Concentration of OH group | 8 | 8 | 9 | 10 | 12 | 21 | 22 | 23 | 24 | 25 |

From the results shown in Tables 1 and 2, it can be seen that the polycarbonate resin compositions of Examples 1 to 5 have excellent properties in terms of impact strength, flexural strength, impact resistance, and processability.

In the polycarbonate resin compositions of Examples 1 to 5, the polycarbonate resin having an end capping rate of 85% (hydroxyl group concentration: 15%) is used to suppress reaction with the metal compound to prevent decomposition of the polycarbonate resin, thereby maintaining mechanical properties such as impact strength, flexural strength, and impact resistance at a high level.

In addition, it can be seen that the polycarbonate resin compositions of Examples 1 to 5 suffer less decomposition of the polycarbonate resin, since the polycarbonate resin compositions of Examples 1 to 5 have relatively low melt-flow index, as compared with the corresponding Comparative Examples.

Further, the polycarbonate resin compositions of Examples 1 to 5 have a considerably low generation amount of VOCs, as compared with the corresponding Comparative Examples, and thus can be expected to realize excellent processability.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition comprising:
   (A) about 50 wt % to about 85 wt % of a polycarbonate resin including end groups, wherein the end groups include a hydroxyl group (—OH) in an amount of about 1% to about 20% based on the total weight (100 wt %) of all end groups;
   (B) about 1 wt % to about 20 wt % of a metal compound comprising a copper salt, wherein the copper salt comprises at least one of copper hydroxide phosphate, copper phosphate, copper sulfate, and cuprous thiocyanate; and
   (C) about 1 wt % to about 40 wt % of inorganic fillers, wherein the polycarbonate resin composition has a gas generation amount of about 50 total peak area to about 340 total peak area per hour, as measured on about 2 g of pellets of the polycarbonate resin composition having been dried for about 5 hours using a static headspace sampler by headspace gas chromatography (HS-GC).

2. The polycarbonate resin composition according to claim 1, wherein a weight ratio of the polycarbonate resin (A) to the metal compound (B) ranges from about 100: about 1 to about 100: about 30.

3. The polycarbonate resin composition according to claim 1, wherein the inorganic fillers (C) comprise glass fibers.

4. The polycarbonate resin composition according to claim 1, wherein the polycarbonate resin (A) contains about 10,000 ppm to about 200,000 ppm of the hydroxyl group (—OH).

5. The polycarbonate resin composition according to claim 1, wherein the polycarbonate resin composition has an impact resistance of about 40 cm to about 100 cm, as measured on a plate-type injection molded specimen having a size of about 1 mm×about 5 cm×about 5 cm (thickness×width×length) and left for aging at room temperature for 6 hours using a falling weight impact tester with a 500 g weight in accordance with DuPont drop test method, in which the impact resistance is found by impacting 20 specimens with the weight to measure a height of the weight at which about 50% of each specimen is broken, followed by averaging values of the height.

6. The polycarbonate resin composition according to claim 1, comprising (A) about 50 wt % to about 84 wt % of the polycarbonate resin including end groups, wherein the end groups include a hydroxyl group (—OH) in an amount of about 1% to about 20% based on the total weight (100 wt %) of all end groups.

7. The polycarbonate resin composition according to claim 1, comprising (A) about 50 wt % to about 82 wt % of the polycarbonate resin including end groups, wherein the end groups include a hydroxyl group (—OH) in an amount of about 1% to about 20% based on the total weight (100 wt %) of all end groups.

8. The polycarbonate resin composition according to claim 1, wherein the polycarbonate resin (A) includes the hydroxyl group (—OH) in an amount of about 15% to about 20% based on the total weight (100 wt %) of all end groups.

9. A molded article manufactured using the polycarbonate resin composition according to claim 1.

* * * * *